United States Patent [19]

Hawkins

[11] Patent Number: 5,685,198

[45] Date of Patent: Nov. 11, 1997

[54] BICYCLE GEAR CHANGER

[76] Inventor: Tranel W. Hawkins, 831 Spencer Ave., San Jose, Calif. 95125

[21] Appl. No.: 518,786

[22] Filed: Aug. 24, 1995

[51] Int. Cl.$^6$ .............................. F16C 1/18; B62K 23/04
[52] U.S. Cl. .............................. 74/502.2; 74/489; 74/506
[58] Field of Search ........................ 74/506, 489, 502.2

[56] References Cited

U.S. PATENT DOCUMENTS

| | | | |
|---|---|---|---|
| 3,633,437 | 1/1972 | Ishida | 74/489 |
| 4,232,564 | 11/1980 | Yamasaki | 74/489 X |
| 4,900,291 | 2/1990 | Patterson | 474/80 |
| 4,938,733 | 7/1990 | Patterson | 474/80 |
| 5,102,372 | 4/1992 | Patterson et al. | 474/80 |
| 5,241,877 | 9/1993 | Chen | 74/489 |
| 5,315,891 | 5/1994 | Tagawa | 74/489 |
| 5,390,565 | 2/1995 | Tagawa et al. | 74/502.2 |

*Primary Examiner*—Charles A. Marmor
*Assistant Examiner*—Mary Ann Battista
*Attorney, Agent, or Firm*—Robert Samuel Smith

[57] ABSTRACT

A derailleur activating device attachable to the handlebar of a bicycle also having a frame and a derailleur with a gear cable, wherein the device has a bracket tube secured to the handlebar of the bicycle, a shifting sleeve rotatably mounted on the bracket member, a pulley rotatably mounted on the shifting sleeve and a gear cable with an end of the gear cable attached to the bracket tube. The cable is wrapped partially around the pulley such that, when the shifting sleeve is rotated, the pulley is displaced causing the gear cable to be pulled such as to shift the gears of the derailleur.

7 Claims, 3 Drawing Sheets

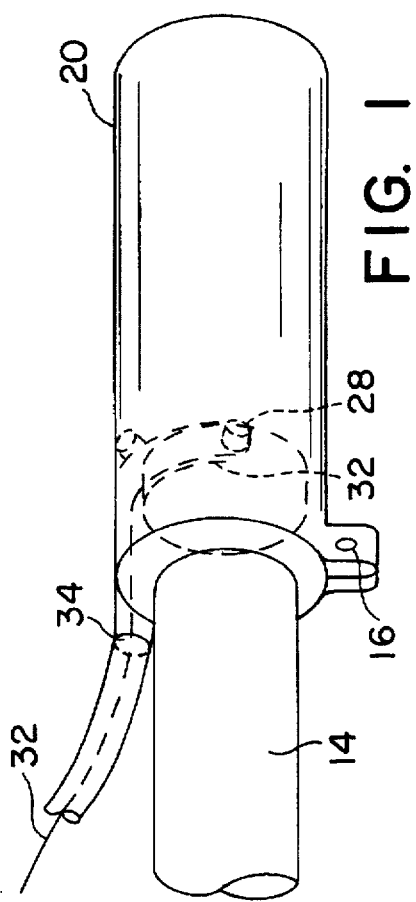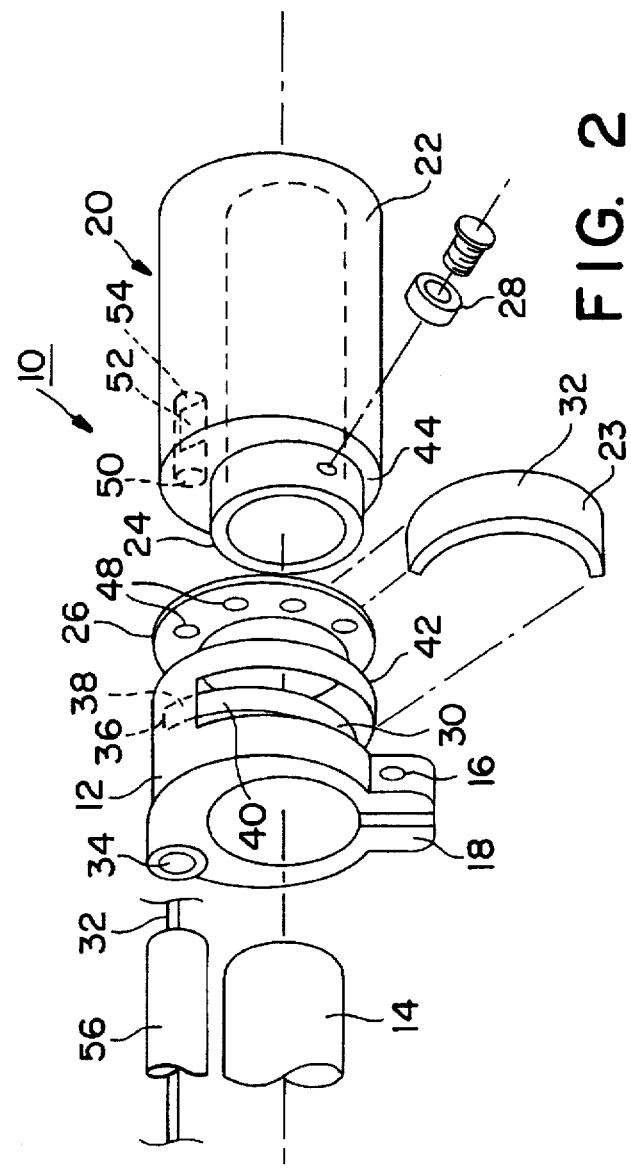

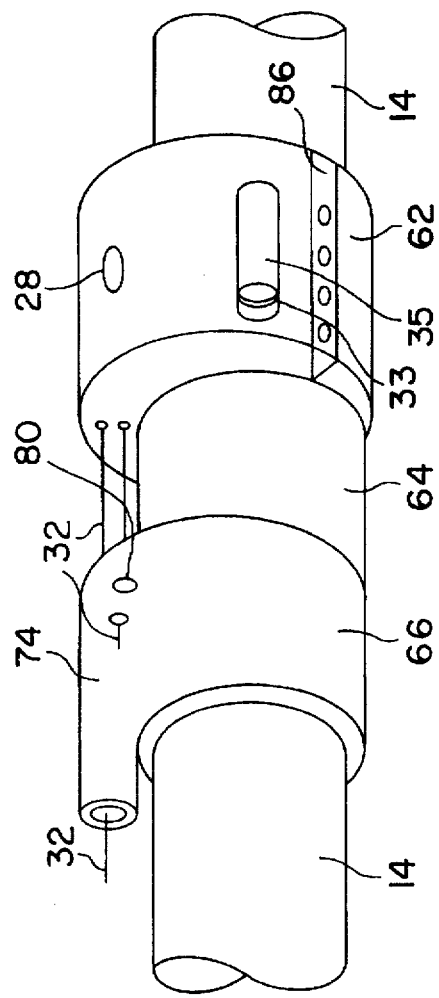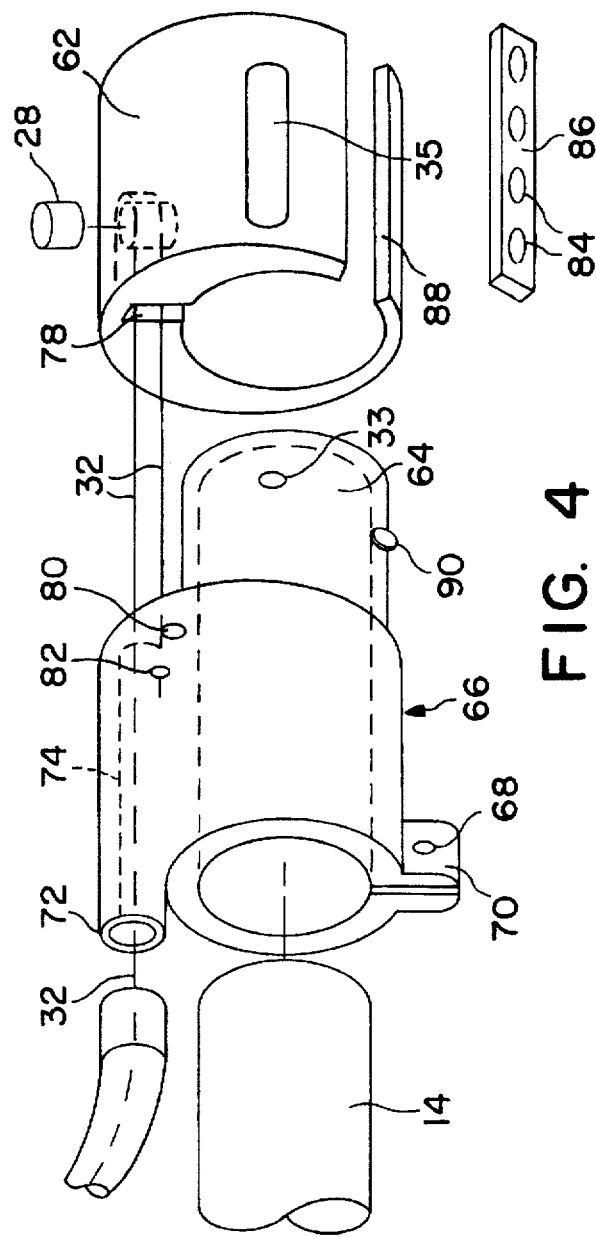

BICYCLE GEAR CHANGER

FIELD OF THE INVENTION

This invention relates to bicycle gear changers and particularly to a gear changer including a sleeve mounted on the handle bar of a bicycle wherein gears are changed by rotating a sleeve

BACKGROUND AND INFORMATION DISCLOSURE

A growing technology in the bicycle art has been the various devices for actuating the derailleur cable system. In general, a cable has one end attached to the derailleur and an opposite end attached to the actuating device which is typically mounted on the bicycle handle. The rider operates the device such as to shorten or lengthen the cable thereby causing the derailleur to shift the gears of the bicycle in a manner well known in the industry.

U.S. Pat. No. 3,633,437 to T. Ishida discloses a gear changer including a drive member rotatably driven by a knob, a driven member rotated by the drive member, a wire having an end attached to the driven member so that by using the knob to turn the drive member, the driven member is rotated such as to extend or retract the wire attached to the derailleur of a bicycle. This arrangement requires that the user release his grip on the handle bar and turn the knob with a finger or thumb.

U.S. Pat. No. 4,900291 to Patterson discloses a shifting system having a rotatable handgrip actuator cam which is coupled to the derailleur shifting mechanism through a control cable system so as to control the derailleur. Separate actuator cams are associated with the front and rear derailleurs providing a stepwise shifting of the gears.

U.S. Pat. No. 4,938,733 to Patterson discloses a derailleur gear shifting system featuring an actuator cam rotatably mounted on the handgrip of the handlebar and coupled to a gear cable wherein the rotational axis of rotation of the cam is generally transverse to the cam surface. The cam surface is contoured to compensate for increasing tension of the derailleur return spring as the hand grip is rotated.

U.S. Pat. No. 5,102,372 to Patterson et al discloses a derailleur gear shifting system featuring an actuator cam rotatably mounted on the handgrip of the handlebar and coupled to a gear cable wherein the rotational axis of rotation of the cam is generally transverse to the cam surface. The cam surface is contoured to compensate for increasing tension of the derailleur return spring and also to overshift the chain a sufficient amount beyond the destination free wheel sprocket so that the chain will approach the freewheel sprocket in the down shift direction as in the upshift direction as the hand grip is rotated.

U. S. Pat. 5,241,877 to Chen discloses a gear selector including a rotatable sleeve member which is detachably coupled to a tubular rotatable member by a retractable projection mounted on one end of the tubular member. A cable has one end attached to the derailleur mechanism, raps around a grooved surface of the sleeve member and has another end attached to the tubular member. The grooved surface of the sleeve is configured such that, as the sleeve is rotated the length of cable contacting the groove is increased thereby pulling on the cable. An inherent problem with the construction is the frictional force generated by the cable sliding over the grooved surface of the sleeve.

U.S. Pat. No. 5,315,891 to Tagawa discloses a combination brake and speed changer wherein the speed changer comprises a cylindrical operation member rotatably supported around a grip end portion of a handlebar, a speed change operation mechanism provided in proximity of that grip end portion of the handlebar and capable of winding and unwinding a speed control cable and a transmission mechanism provided between the cylindrical operation member and the speed change operation mechanism.

U.S. Pat. No. 5,390,565 to Tagawa et al discloses a brake an gear changing system in which a direction changing reel guides a gear cable around a rotatable handgrip sleeve.

A limitation of all of these systems is that the rotational distance that the wrist must turn the rotatable sleeve is excessive. Another problem is that different brands of derailleurs in the market place have different dimensions such that anyone of these gear changing systems can be built to fit only one derailleur. Another problem is that stretching of the gear wire which occurs over a period of time is not conveniently correctable. Another limitation is that the mechanism is complicated and therefore more expensive and more susceptible to maintenance problems compared to the derailleur actuating device of the present invention.

OBJECTS

It is therefore an object of the present invention that the derailleur actuator inherently require less rotation of the wrist to shift gears than is required by systems of the present art.

It is another object to provide a derailleur actuating system which can be used with any derailleur in the market place by making an easy replacement of a single part.

It is another object of this invention that the user be able to make quick and convenient adjustments of tension in the cable which generally changes with time as the cable is subjected to tension.

It is another object that the derailleur actuating device be much simpler and have fewer parts and is therefore easier to maintain.

SUMMARY

The derailleur actuator of this invention according to one embodiment is directed toward a shifting sleeve which is rotatably mounted on the handle bar of a bicycle and which the user can conveniently grasp and rotate to shift gears without changing the position of the hand.

The shifting sleeve has one end rotatably inserted into a stationary bracket also mounted on the handlebar. One end of a gear cable is secured to the inside surface of the bracket and extends around a pulley mounted on the inserted end of the shifting sleeve. The gear cable is then doubled back and led outside the bracket to a gear derailleur. Therefore, when the shifting sleeve is turned so that the pulley moves a given distance, the gear cable around the pulley moves twice the distance thereby reducing the amount of turning required to shift the gear.

A spring loaded detent ball is mounted in an end of the shift sleeve that snaps into depressions in a detent plate positioned against the end of the shifting sleeve and secured to the bracket. The spacing of the depressions is selected according to the requirement for shifting the gears. The detent plate is readily replaceable according to the dimensions of the derailleur. Therefore, the invention is adaptable to various brands of derailleurs.

In another embodiment, the shift sleeve is slid linearly to shift the derailleur, the gear cable is attached to a bracket secured to the handlebar and passes around a pulley mounted on the slidable shift sleeve, then out to the derailleur. The spring loaded detent ball is mounted in the bracket and a replaceable detent plate with depressions is secured to the side of a section of the bracket inserted into the sliding sleeve.

In yet another embodiment, the pulley is mounted on a shifter plate with a lever and mounted on the down tube of the bicycle.

THE FIGURES

FIG. 1 is a perspective view of the invention.

FIG. 2 is an exploded view of the embodiment of FIG. 1.

FIG. 3 is another embodiment of the invention invoking linear motion of the shifting sleeve.

FIG. 4 is an exploded view of FIG. 3.

DESCRIPTION OF A PREFERRED MODE

Figure 5:
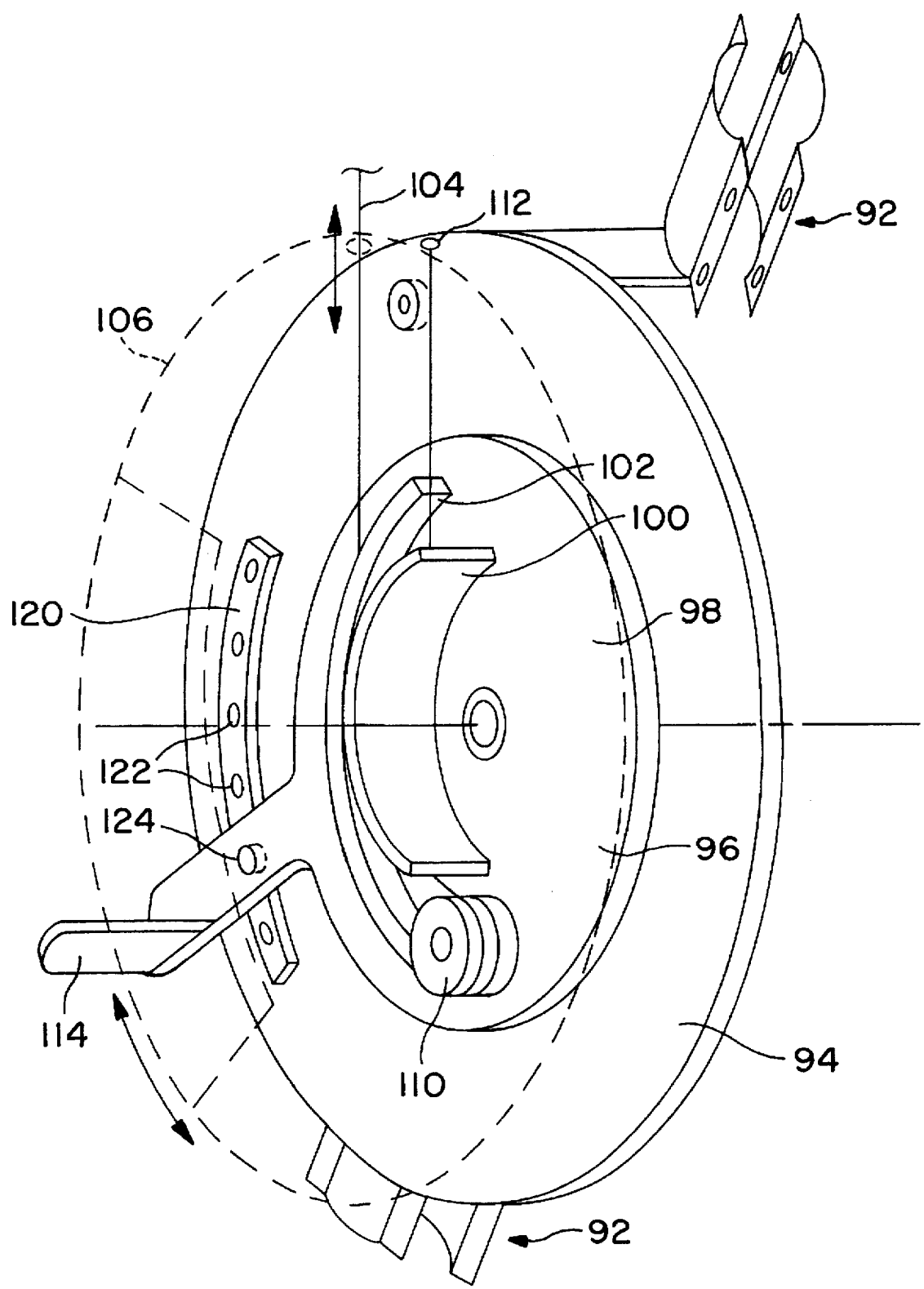
FIG. 5 is yet another embodiment of the invention featuring a shift lever.

Turning now to a discussion of the drawings, FIG. 1 is an assembly view and FIG. 2 is an exploded view of one embodiment of the invention 10 showing a bracket 12 slidable at one end onto a handlebar 14. The bracket is secured to handlebar 14 by a bolt 16 through flanges 18 which squeeze the handlebar 14 when the bolt 16 is tightened. A shifting sleeve 20 includes a larger handle section 22 and a reduced section 24. Reduced section 24 is inserted through detent plate 26 and into the interior of bracket 12 and over handlebar 14. A pulley 28 is mounted on reduced section 24 through a slot 30. A gear cable 32 passes through an entrance 34 in bracket 12 and around pulley 28 then through an opening 40 in the bracket where an end of the gear cable is accessible to the user and is secured to the bracket 12 by bolt 36. Accessibility to the end of the cable permits the user to shorten the gear cable when the cable stretches over time. The end surface 42 of the bracket 12 and the shoulder 44 of the shifting sleeve 20 abut opposite sides of the detent plate 26 which has spaced holes 48. A detent ball 50 is spring loaded by spring 52 recessed 54 in shifting sleeve 20. The device is mounted by attaching the bracket to the handle bar 14, attaching the sheath 56 of the gear cable to the entrance 34 of the bracket and leading the cable into the interior of the bracket, then sliding the reduced end 24 of the shifting sleeve 20 onto the handle bar 14 and into the bracket 12 and detent plate 26. The pulley 28 is then mounted onto the reduced end 24 and the gear cable 32 is led around the pulley then back into opening 40. Bolt 36 is tightened to secure the end of the gear cable 32. Finally, cap 23 is snapped over the groove 30 in bracket 12.

FIG. 3 and 4 show assembled and exploded views respectively of another embodiment of the invention in which the gear cable is pulled by sliding the shifting sleeve 62 mounted on a reduced section 64 of bracket 66. Bracket 66 is secured to handlebar 14 by a bolt 68 through flanges 70. Gear cable 32 passes through entrance 72 to passage 74 in bracket 66 and passage 78 in shifting sleeve 62. Cable 32 passes around pulley 28 rotatably mounted in shifting sleeve 62 then returns to bracket 66 to which it is secured by bolt 80. The end of cable 32 passes through opening 82 in the side of bracket 66 where it is accessible to the user.

A nub 33 on reduced section 64 engages a slot in shifting sleeve 62 to maintain engagement of the shifting sleeve over the reduced section 64.

A detent plate 86 snaps into a slot 88 in shifting sleeve 62. A detent ball 90 is recessed partially into reduced section 64 of bracket 66. Detent ball 90 engages detent depressions 84 successively as the shifting sleeve 62 is slid so that the shifting sleeve is engagable in positions corresponding to required positions of the derailleur.

FIG. 5 shows yet another embodiment of the invention that is particularly advantageous on mountain bikes. There is shown a bracket (plate) 94 secured to the vertical bar 90 (cutaway) of the bike frame by clamps 92. A shifting plate 98 is rotatably mounted on the bracket plate 94 and is provided with an inner guide 100 and an outer guide 102. A gear cable 104 (cutaway) leads from a derailleur (not shown) through an opening in a hood 106 (shown in phantom), directed by outer guide 102 to wrap halfway around pulley 110 then is guided by inner guide 100 to an anchoring bolt 112 where it is secured to bracket plate 94. Pulley 110 is rotatably mounted on shifting plate 98. The shifting plate 98 is provided with a lever 114 which the user conveniently turns to pull on the gear cable. The double back arrangement of the gear cable causes the gear cable to be displaced twice the distance that the pulley 110 is moved by turning the lever 114. A replaceable detent plate 120 has detents 122 which engage a ball 124 partially recessed in lever 114 corresponding to the derailleur position.

An important feature of the embodiments shown in FIGS. 1–4 is the ability to correct for changes in the cable length due to stretching of the cable 32 which can occur over time.

Correction is made by simply pulling the cable 32 through the respective apertures 36 or 82 and cutting off the extra length of cable.

Another advantage of this construction is the ability to easily change the detent plates 26, 86 or 120 which have an appropriate spacing between detent depressions according to the dimensions of the derailleur. Dimensions of the derailleurs are different for different brands of derailleurs.

The improvements provided by features of the present invention over the cited art are:

1. Ergonomic—Shifting of the bicycle gears is accomplished by simply twisting the wrist upwards or downwards. Also, since the shift sleeve is a part of the grip, shifting can occur while standing on the pedals or sitting in the saddle. This movement can only be accomplished with a speed changing device what incorporates a sleeve handle ergonomically with the bicycle hand grip.
2. Safety—The user shifts gears without removing his hands from the handlebar. This allows the user to maintain control of the bicycle at all times thereby making riding the bicycle a safer operation.
3. Faster shifting—The user does not have to reach or change hand positions to use the speed changing device. This allows for a quicker response time for shifting.
4. Braking and shifting simultaneously—The construction of the present invention with the hand brake positioned closely to the hand grip of the bicycle allowing shifting to be accomplished while braking with either hand.

The foregoing embodiments illustrate advantages of the invention which include ease in adjusting for changes in the length of the cable, accommodation to different brands of derailleurs, eliminating the need for excessive rotation of the wrist, the convenience of placing a brake lever close to the hand grip and the gear changing handle. These advantages result from a construction involving the pulley mounted on the shifting member. Other variations of the invention may be suggested by reading the specification and studying the drawings which are within the scope of the invention. I therefore wish to define my invention by the appended claims.

I claim:

1. A derailleur activating device for a bicycle having a handlebar and a frame, said device comprising:

a derailleur with a gear cable;

a bracket means adapted for securing said device to said bicycle;

a shifting means rotatably mounted on said bracket means;

a pulley, being a wheel with an outer circumferential surface, rotatably mounted on a peripheral surface of said shifting means;

means adapted for attaching an end of said gear cable to said bracket means with said cable wrapped partially around said circumferential surface of said pulley such that, when said pulley is displaced by a user rotating said shifting means, said gear cable is pulled to shift gears of said derailleur.

2. The device of claim 1 which comprises:

a detent plate having a plurality of depressions arranged in a row secured to said bracket means;

a spring loaded detent secured to said shifting means and arranged to engage each one of said depressions successively as said user displaces said shifting means from one position to another corresponding to shifting gears of said derailleur.

3. The device of claim 1 which comprises:

a detent plate having a plurality of depressions arranged in a row secured to said shifting means;

a spring loaded detent secured to said bracket means and arranged to engage each one of said depressions successively as said user displaces said shifting means from one position to another corresponding to shifting gears of said derailleur.

4. The device of claim 1 wherein:

said bracket means comprises a bracket sleeve and clamps for clamping said bracket sleeve onto said handlebar;

said shifting means comprises a shifting sleeve rotatably mounted on said bracket sleeve such that the user is enabled to grasp said shifting sleeve and rotate said shifting sleeve thereby displacing said pulley.

5. The device of claim 1 wherein:

said bracket means comprises a bracket sleeve with a clamp means for clamping said bracket means to said handlebar with said handlebar extending through said bracket sleeve;

said shifting means comprises a shifting sleeve slidably mounted on said bracket sleeve and said handlebar;

means for constraining sliding of said shifting sleeve such that the user is enabled to grasp said shifting sleeve and slide said shifting sleeve in a direction along an axis of said handlebar thereby displacing said pulley.

6. The device of claim 1 wherein:

said bracket means comprises a bracket plate with a clamp means for clamping said bracket plate to said frame of said bicycle;

said shifting means comprises a shifting plate rotatably mounted on said bracket plate with guide means for directing said gear cable around said pulley attached to said shifting plate and a lever means accessible to said user for rotating said shifting plate to one of a plurality of positions, each position corresponding to a gear position of said derailleur.

7. The device of claim 6 which comprises a cover means for enclosing said shifting plate between said cover means and said bracket plate.

* * * * *